(12) United States Patent
Eigel et al.

(10) Patent No.: US 11,345,401 B2
(45) Date of Patent: May 31, 2022

(54) RECOGNITION OF HANDS-OFF SITUATIONS BASED ON SWARM DATA

(71) Applicant: Volkswagen Aktiengesellschaft, Wolfsburg (DE)

(72) Inventors: Thomas Eigel, Berlin (DE); Felix Stahl, Braunschweig (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 44 days.

(21) Appl. No.: 17/016,882

(22) Filed: Sep. 10, 2020

(65) Prior Publication Data
US 2021/0070358 A1    Mar. 11, 2021

(30) Foreign Application Priority Data
Sep. 11, 2019    (DE) .................... 10 2019 213 880.2

(51) Int. Cl.
*B60W 40/09* (2012.01)
*B60W 40/08* (2012.01)
*B62D 15/02* (2006.01)

(52) U.S. Cl.
CPC .......... *B62D 15/025* (2013.01); *B60W 40/09* (2013.01); *B62D 15/029* (2013.01); *B60W 2510/202* (2013.01); *B60W 2540/18* (2013.01)

(58) Field of Classification Search
CPC .......... B60K 28/06; B60W 2040/0818; B60W 2050/0018; B60W 2420/24; B60W 2510/202; B60W 2540/18; B60W 2540/223; B60W 2552/53; B60W 40/06; B60W 40/08; B60W 40/09;
(Continued)

(56) References Cited

U.S. PATENT DOCUMENTS 7,164,117 B2    1/2007    Breed et al. .................. 250/221
9,604,649 B1    3/2017    Pastor et al.
(Continued)

FOREIGN PATENT DOCUMENTS

DE    102008042277 A1    4/2010    ............... B62D 1/06
DE    102011109711 A1    2/2013    ............ B60R 16/02
(Continued)

OTHER PUBLICATIONS

German Office Action, Application No. 102019213880.2, 6 pages, dated Mar. 23, 2020.

*Primary Examiner* — Peter D Nolan
*Assistant Examiner* — Ce Li Li
(74) *Attorney, Agent, or Firm* — Slayden Grubert Beard PLLC

(57) ABSTRACT

The invention relates to a method for improving hands-off recognition in a vehicle with steering torque-based recognition in that swarm data are provided from vehicles that recognize hands-off situations with hand distance sensors in the steering wheel. Both recognition results over a certain route section are compared and, in the case of deviations, the correctness of the results of the hand distance sensors is assumed. On this basis, route sections are determined in which steering torque-based recognition is unreliable. Based on this recognition, systems with steering torque evaluation can then be re-parameterized in order to be more reliable relative to the route.

16 Claims, 1 Drawing Sheet

(58) Field of Classification Search
CPC ............. B60W 50/0097; B62D 15/025; B62D 15/029; B62D 5/046; G06K 9/00798; G06N 3/08; G08B 21/06; G08G 1/0112; G08G 1/0137

See application file for complete search history.

(56) References Cited

U.S. PATENT DOCUMENTS

2004/0039509 A1 2/2004 Breed ............................. 701/45
2013/0297204 A1* 11/2013 Bartels ................. G01C 25/005
  701/495

FOREIGN PATENT DOCUMENTS

DE   102013224512 A1   6/2015   ............. G08B 21/02
EP         3075618 A2  10/2016   ............. B60W 10/04
WO      2015/200224 A2  12/2015   ............. B60W 40/08

* cited by examiner

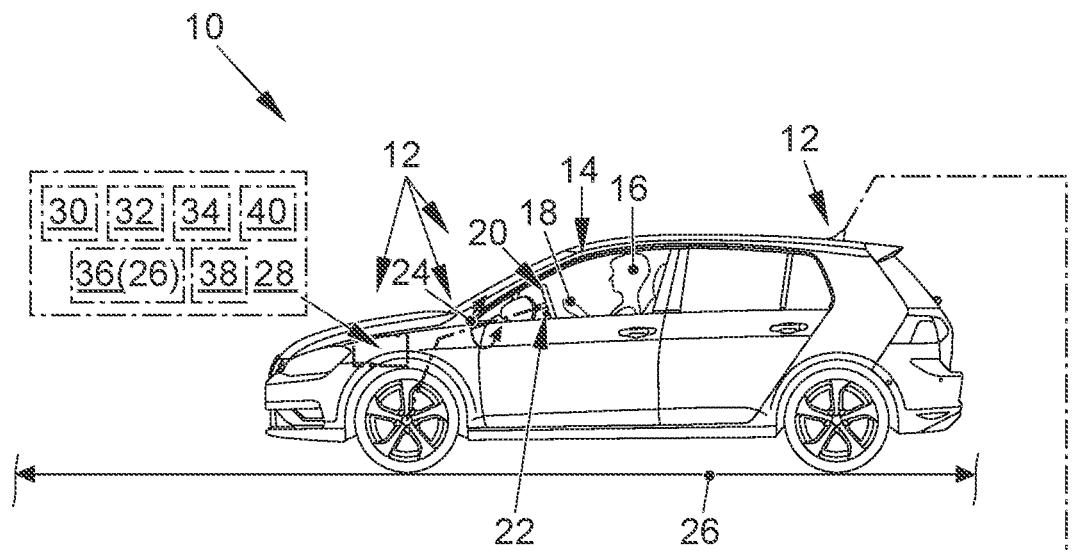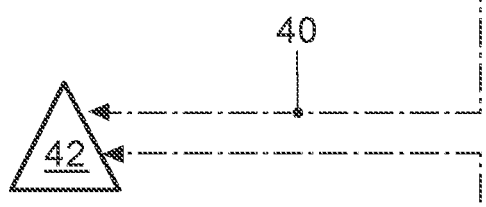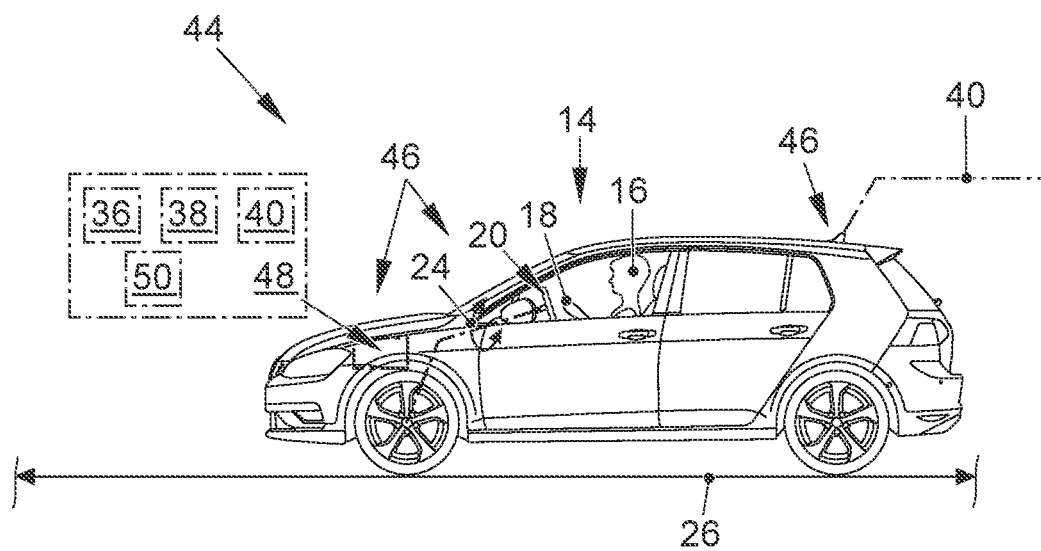

RECOGNITION OF HANDS-OFF SITUATIONS BASED ON SWARM DATA

CROSS-REFERENCE TO RELATED APPLICATIONS

This application claims priority to German Patent Application No. 10 2019 213 880.2, filed on Sep. 11, 2019 with the German Patent and Trademark Office. The contents of the aforesaid Patent Application are incorporated herein for all purposes.

TECHNICAL FIELD

The invention relates to a method for preparing route-related calibration data, a method for calibrating a driver assistance system, a driver assistance system, a computing device, and a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In the field of vehicles, in particular motor vehicles, monitoring the steering activity of a driver is a known task. A very wide range of safety inferences can be drawn from the steering activity. One particularly important aspect in this regard is the recognition of hands-off situations, i.e., moments in which the driver does not have his hands on the steering wheel.

It is possible to evaluate steering torque characteristics, for example, and analytically investigate them for indications that a hands-off situation exists. Expressed simply, if the steering torque for example falls below a limit value, this may be assessed as a sign of a hands-off situation since the driver is apparently no longer exerting opposing force on the steering wheel to compensate for the influences of the road on wheels. However, such approaches are only conditionally reliable and precise.

It is also possible for example to use capacitive distance sensors in order to directly measure the hands-off situation. Such solutions are highly precise, however they are associated with great technical complexity.

SUMMARY

An object exists to create an improved method for recognizing hands-off situations with which the recognition quality of a direct measurement such as for example using a capacitive distance sensor can also be achieved with driver assistance systems that themselves have a lower recognition quality, such as for example with indirect measurement by measuring steering torque characteristics.

This object is solved by the subject matter according to the independent claims. Embodiments of the invention are discussed in the dependent claims and the following description.

According to a first exemplary aspect, a method for preparing route-related calibration data for a driver assistance system that is designed to recognize hands-off situations in a vehicle is provided that comprises the following steps:

recognizing hands-off situations by vehicles along route sections by using driver assistance systems with a first recognition quality;

recognizing hands-off situations by vehicles along the same route sections by using driver assistance systems with a higher recognition quality;

identifying route sections in which there is a difference in the amount of hands-off situations recognized by the driver assistance systems with the first recognition quality, and the amount of hands-off situations recognized by the driver assistance systems with a higher recognition quality; and preparing therefrom the route-related calibration data while forming reliability parameters for recognition with the first recognition quality on the respective route sections depending on the existing difference.

The details of one or more embodiments are set forth in the accompanying drawings and the description below. Other features will be apparent from the description, drawings, and from the claims.

BRIEF DESCRIPTION OF THE DRAWING

The single shows a method for preparing route-related calibration data and for calibrating a driver assistance system using the calibration data.

DESCRIPTION

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method is provided for preparing route-related calibration data for a driver assistance system that is designed to recognize hands-off situations in a vehicle which comprises the following steps:

recognizing hands-off situations by vehicles along route sections using driver assistance systems with a first recognition quality;

recognizing hands-off situations by vehicles along the same route sections using driver assistance systems with higher recognition quality;

determining route sections on which there is a difference in the amount of hands-off situations recognized by the driver assistance systems with the first recognition quality, and the amount of hands-off situations recognized by the driver assistance systems with the higher recognition quality, and preparing therefrom the route-related calibration data while forming reliability parameters for recognition with the first recognition quality on the respective route sections depending on the existing difference.

The greater the existing difference, the less pronounced the reliability parameter; expressed otherwise, the more unreliable the recognition of hands-off situations with the first recognition quality on the relevant route sections in some embodiments. This can have its origin for example in the route trajectory. If, purely as an example, the route section is long, straight and wide, a driver may tend to only place his hands lightly on the bottom edge of the steering wheel for relaxation and reduce to a minimum the continuous slight corrective movements that occur in otherwise focused driving on more narrow, winding route sections. In such situations, recognition with low recognition quality becomes more unreliable since the signals originating from the driver are weaker.

By applying the teaching of some embodiments disclosed herein, a person skilled in the art can establish a useful limit value for the reliability parameter, and when it is undershot, recognition with the first recognition quality can be considered no longer reliable enough in terms of avoiding false warnings on the one hand and traffic safety on the other hand.

The route-related calibration data prepared in the method according to some embodiments accordingly provides information as to whether, and to what extent, the driver assistance system with the first recognition quality must be recalibrated in order to prevent false warnings and at the same time ensure sufficient safety.

For example and in some embodiments, a plurality of vehicles may be used in order to supply the recognitions for comparing the results with lower and higher recognition quality. A person skilled in the art is aware of this, including under the name of "use of swarm data".

The route-related calibration data may for example in some embodiments be prepared with the inclusion of electronic map material in which the reliability parameters are assigned to the respective route sections in the map.

In recognizing hands-off situations, especially the traffic situation is also taken into account, and the comparison of the number of recognized hands-off situations is related to the time that the vehicle needs to traverse the route section. Accordingly, a number of recognized hands-off situations over the route section per unit time may be produced.

In some embodiments, the method provides that vehicles are used whose driver assistance systems simultaneously perform both recognition with the first recognition quality as well as recognition with the higher recognition quality.

The prepared route-related calibration data therefore may manifest a particularly high validity since a direct comparison of the two recognition qualities relative to the same vehicle is possible, and false warnings when the recognition quality is low are therefore recognized with great precision.

Alternatively, it may also be provided that the respective vehicles transmit from their driver assistance systems, e.g. wirelessly, hands-off situations recognized with different recognition quality and the associated route sections to a central computing facility, possibly located at a distance, which then determines the route sections with an existing difference and prepares the route-related calibration data.

This significantly reduces the technical complexity in the vehicles and enables greater computing performance when preparing the calibration data.

Some embodiment provide that, with the first recognition quality, the hands-off situations are recognized by evaluating steering torque data, and, with the higher recognition quality, the hands-off situations are recognized by evaluating measured data from a capacitive steering wheel sensor.

Capacitive steering wheel sensors directly measure the distance of the hands to the steering wheel and thereby provide highly precise measurement. They therefore offer a particularly effective reference for the distinctly more imprecise evaluation of steering torque characteristics in some embodiments.

Some embodiments provide that the produced route-related calibration data are transmitted by the vehicles or a central computing facility to other vehicles.

For example, transmission is to other vehicles that themselves do not include a driver assistance system that can recognize hands-off situations with a higher recognition quality.

Another exemplary aspect relates to a method for calibrating a driver assistance system that is designed to recognize hands-off situations in a vehicle, comprising the following steps:
  detecting position data of the vehicle while the vehicle is moving along route sections; and in doing so
  by the driver assistance system, recognizing hands-off situations with a first recognition quality.

In some embodiments, the vehicle receives route-related calibration data produced or producible in a method according to the first aspect, e.g., according to the above description, and the driver assistance system uses the calibration data as follows:
  extraction of reliability parameters from the calibration data on those route sections in which the driver assistance system has recognized hands-off situations; and
  adaptation of the recognition sensitivity of the driver assistance system for the respective route sections depending on the significance of the reliability parameter when it falls below a limit value.

Since the vehicle with the first recognition quality may appropriately configure its driver assistance based on the recognitions by the vehicles with the higher recognition quality as a reference, its recognition quality can be significantly enhanced without having to install the more expensive measuring system with a higher recognition quality.

In principle, recognition sensitivity may be increased or reduced in some embodiments. Generally, however, it is to be assumed that the recognition sensitivity will have to be reduced from incorrect positive recognitions rather than it having to be increased from incorrect non-recognitions.

The vehicle may receive the route-related calibration data, e.g., wirelessly from other vehicles, or from a central computing facility in some embodiments.

Against the backdrop of the above description, some embodiments provide that the driver assistance system of the vehicle recognizes the hands-off situations by evaluating steering torque data.

The recognition quality of this evaluation may be significantly increased in some embodiments, for example with the recognitions based on capacitive steering wheel sensor.

Some embodiments provide that the recognition sensitivity is decreased in that steering torque threshold values at which a hands-off situation is recognized are reduced.

The hands-off situation may therefore only recognized when the signals from the driver decrease more strongly than before the reduction of the steering torque threshold values.

Another exemplary aspect relates to a driver assistance system designed to function as a driver assistance system with a first recognition quality, and/or as a driver assistance system with a higher recognition quality in a method according to the preceding aspects, e.g., according to the preceding description.

The driver assistance system may for example be designed to execute a warning or emergency braking as well in the event that a hands-off situation exists.

To reduce the recognition sensitivity, for example a warning time or an emergency braking time may be delayed in this case in some embodiments.

Another exemplary aspect relates to a computing device designed to assume at least one function from the following group in a method according to the preceding aspects pursuant to the preceding description:
- receiving data from vehicles and processing the data on route-related calibration data;
- receiving route-related calibration data from vehicles, and forwarding the data to other vehicles.

A further exemplary aspect relates to a vehicle comprising a driver assistance system pursuant to the preceding description.

Again summarized in other words, the present disclosure relates to a method for improving hands-off recognition in a vehicle with steering torque-based recognition in that swarm data are provided from vehicles that recognize hands-off situations with hand distance sensors in the steering wheel. Both recognition results over a certain route section may be compared and, in the case of deviations, the correctness of the results of the hand distance sensors may be assumed. On this basis, route sections may be determined in which steering torque-based recognition is unreliable. Based on this recognition, systems with steering torque evaluation may then be re-parameterized in order to be more reliable relative to the route.

The various embodiments discussed in this application may be combined with one another, unless designed otherwise in individual cases.

The invention will be explained in further exemplary embodiments below based on the associated drawing.

In the exemplary embodiments discussed herein, the described components or steps of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGURE. It is further noted that the FIGURE are schematic and provided for guidance to the skilled reader and are not necessarily drawn to scale. Rather, the various drawing scales, aspect ratios, and numbers of components shown in the FIGURE may be purposely distorted to make certain features or relationships easier to understand.

In the top part, the FIGURE shows a vehicle 10 in an embodiment. The vehicle 10 is representative of a plurality of such vehicles.

The vehicle 10 comprises a driver assistance system 12 according to an embodiment. This is designed to perform a recognition of hands-off situations 14 while driving, i.e., situations in which a driver 16 does not have his hands 18 on the steering wheel 20 as shown as an example in the top part of the FIGURE.

The driver assistance system 12 comprises two different technical systems for recognizing such hands-off situations 14. On the one hand, the driver assistance system 12 has a steering wheel sensor 22 integrated in the steering wheel 20 with which a removal of the hands 18 from the steering wheel 20 can be directly recognized capacitively. On the other hand, the driver assistance system 12 has a sensor for measuring a steering torque 24. Conclusions about the existence of a hands-off situation 14 can also be drawn from the steering torque 24 since the driver 16 does not exert any force on the steering wheel 20 in such situations.

Given the system, recognition of a hands-off situation 14 using the steering torque 24 is associated with a lower steering quality, in the following termed a first steering quality, than recognition with the steering wheel sensor 22, in the following termed a higher recognition quality.

In the method discussed herein, the vehicle 10 drives along a route section 26, the principle of which is shown here. While the vehicle 10 is driving, hands-off situations 14 are sought both using the steering torque 24 as well as with the steering wheel sensor 22. The sensor for detecting the steering torque 24 and the steering wheel sensor 22 are operatively connected in this example to a control unit 28 that for example belongs to the driver assistance system 12 in this case.

In the control unit 28, steering torque data 30 and measurement data 32 from the steering wheel sensor 22 come together with position data 34 on the vehicle 10 so that which steering torque data 30 and which measurement data 32 from the steering wheel sensor 22 have been detected at a common point along the route section 26 can always be assigned.

Purely as an example, the control unit 28 determines in this case a hands-off situation 14 from the measurement data 32 of the steering wheel sensor 22 and, purely as an example, five hands-off situations 14 from the steering torque data 30 along the route section 26.

From this, the control unit 28 determines that a difference 36 exists over the route section 26 between the amount of hands-off situations 14 that were recognized with the first recognition quality, and the amount of hands-off situations 14 that were recognized with the higher recognition quality. In this example, the difference 36 is "four".

From the difference 36, a reliability parameter 38 for recognition with the first recognition quality is determined by the control unit 28, which decreases when the difference 36 increases.

By including the reliability parameters 38, the control unit 28 then prepares route-related calibration data 40 in which the reliability parameters 38 are linked with the route section 26 in terms of information technology, for example by the position data 34.

The route-related calibration data 40 therefore indicate that a recognition of hands-off situations 14 from steering torque data along the route section 26 is relatively unreliable. For example, the difference 36 or a percentage value as well can be used as a measure of the reliability parameter 38. As a percentage value, for example the recognitions by the steering wheel sensor 22 can be related to the recognitions from the steering torque data 30 so that in this case a percentage value of ⅕, or respectively 0.2 or 20% results, for example. If this percentage value decreases, it means a reduced reliability of the recognitions from the steering torque data 30. By using the teaching described here, a person skilled in the art can establish which limit value must first be reached for the recognitions from the steering torque data 30 to be still considered reliable. This could be 90%, 95% or more. The route-related calibration data 40 accordingly also provide information on how unreliable or reliable the recognitions are from the steering torque data 30, and therefore how effectively a driver assistance system 12, 46 (see also the bottom part of the FIGURE) recognizes hands-off situations 14 based on steering torque data 30 to which route sections 26 must be calibrated.

These route-related calibration data 40 are wirelessly transmitted by the vehicle 10 in this example to a central computing facility 42 according to an embodiment that is illustrated approximately in the middle of the FIGURE. This may for example be a mobile communications base station that may be located at a greater distance.

The computing facility 42 transmits the route-related calibration data 40 in this example to another vehicle 44. The other vehicle 44 can be representative of a plurality of such vehicles 44.

The vehicle 44 has a driver assistance system 46 according to the teachings herein. This is also designed to perform a recognition of hands-off situations 14 while driving. To recognize hands-off situations 14, the driver assistance system 46 only comprises a single sensor in this case, however, to measure a steering torque 24 and is therefore significantly more economical than the vehicle 10.

In the following, it will be explained how, in the context of a method according to some embodiments, the driver assistance system 46 is calibrated to recognize hands-off situations 14 so that it achieves nearly the same higher recognition quality as the driver assistance system 12 with the steering wheel sensor 22:

The vehicle 44 moves along the same route section 26, records its position data 34, and performs a recognition of hands-off situations 14 using the driver assistance system 46. In doing so, it conventionally only reaches the first recognition quality.

In the method according to the present embodiment, the vehicle 44 only receives the route-related calibration data 40 that have been produced in the above-described method.

The driver assistance system 46 has for example a control unit 48. The control unit 48 extracts the reliability parameter 38 of the route section 26 from the received route-related calibration data 40.

From the reliability parameter 38, the control unit 48 gathers the information that the recognition based on steering torque data 30 used on the current route section 26 is unreliable, in particular at a magnitude of four false positive recognitions of a hands-off situation 14 over the route section 26 corresponding to the difference 36.

Since the reliability parameter 38 in this case falls below a limit value established by a person skilled in the art, the driver assistance system 46 reduces its recognition sensitivity as long as the route section 26 is being driven. The quantification of the reduction is usefully established by a person skilled in the art based on the amount of the difference 36.

To reduce the recognition sensitivity, in this case for example a new steering torque threshold value 50 is determined from the amount of the difference 36 that is less than an originally set steering torque threshold value and that must be undershot for a hands-off situation 14 to be recognized. Purely by way of example, the steering torque threshold value 50 can be lowered 80% corresponding to the difference 36.

LIST OF REFERENCE NUMERALS

10 Vehicle
12 Driver assistance system
14 Hands-off situation
16 Driver
18 Hands
20 Steering wheel
22 Steering wheel sensor
24 Steering torque
26 Route section
28 Control unit
30 Steering torque data
32 Measurement data
34 Position data
36 Difference
38 Reliability parameter
40 Calibration data
42 Computing device
44 Vehicle
46 Advanced driver assistance system
48 Control unit
50 Steering torque threshold value The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for preparing route-related calibration data for a driver assistance system that is designed to recognize hands-off situations in a vehicle comprising:
   recognizing one or more hands-off situations using a driver assistance system with a first recognition quality by evaluating steering torque data;
   recognizing one or more hands-off situations using a driver assistance system with a higher recognition quality by evaluating measurement data from a capacitive steering wheel sensor;
   determining position data while the vehicle is moving along a route;
   identifying one or more route sections of the route in which there is a difference in the number of hands-off situations recognized by the driver assistance system with the first recognition quality, and the number of hands-off situations recognized by the driver assistance system with a higher recognition quality; and
   preparing therefrom the route-related calibration data while forming reliability parameters for recognition with the first recognition quality on the respective route sections depending on the existing difference.

2. The method of claim 1, wherein a vehicle is used whose driver assistance system simultaneously performs both recognition with the first recognition quality as well as recognition with the higher recognition quality.

3. The method of claim 2, wherein the route-related calibration data are transmitted by the vehicle or a central computing facility to other vehicles.

4. The method of claim 1, wherein the route-related calibration data are transmitted by the vehicle or a central computing facility to other vehicles.

5. A driver assistance system configured to function as a driver assistance system with a first recognition quality in the method of claim 1.

6. A vehicle comprising the driver assistance system of claim 5.

7. A computing device designed to assume at least one function from the following group in the method of claim 1:
   receiving data from one or more vehicles and processing the data on route-related calibration data; and
   receiving route-related calibration data from one or more vehicles and forwarding the data to other vehicles.

8. A driver assistance system configured to function as a driver assistance system with a higher recognition quality in the method of claim 1.

9. A driver assistance system configured to function as a driver assistance system with a first recognition quality and as a driver assistance system with a higher recognition quality in the method of claim 1.

10. The method of claim 1, comprising assigning steering torque data and measurement data to one or more common points along the route.

11. A method for calibrating a driver assistance system that is designed to recognize hands-off situations in a vehicle, comprising:
  detecting position data of the vehicle while the vehicle is moving along a route section; and in doing so by the driver assistance system, recognizing hands-off situations with a first recognition quality;
  wherein the vehicle receives route-related calibration data and the driver assistance system uses the calibration data by:
    extracting reliability parameters from the calibration data on those route sections in which the driver assistance system has recognized hands-off situations; and
    adapting the recognition sensitivity of the driver assistance system for the respective route sections depending on the significance of the reliability parameter when it falls below a limit value.

12. The method of claim 11, wherein the driver assistance system of the vehicle recognizes the hands-off situations by evaluating steering torque data.

13. The method of claim 12, wherein the recognition sensitivity is decreased in that steering torque threshold values at which a hands-off situation is recognized, are reduced.

14. The method of claim 11, wherein the recognition sensitivity is decreased in that steering torque threshold values at which a hands-off situation is recognized, are reduced.

15. A driver assistance system configured to function as a driver assistance system with a first recognition quality in the method of claim 11.

16. A computing device designed to assume at least one function from the following group in the method of claim 11:
  receiving data from one or more vehicles and processing the data on route-related calibration data;
  receiving route-related calibration data from one or more vehicles and forwarding the data to other vehicles.

* * * * *